United States Patent [19]
Sakamoto

[11] Patent Number: 4,498,109
[45] Date of Patent: * Feb. 5, 1985

[54] PICTURE OUTLINE TRACING AND RECORDING MACHINE

[75] Inventor: Takashi Sakamoto, Kyoto, Japan

[73] Assignee: Dainippon Screen Seizo Kabushiki Kaisha, Kyoto, Japan

[*] Notice: The portion of the term of this patent subsequent to Nov. 10, 1998 has been disclaimed.

[21] Appl. No.: 126,439

[22] Filed: Mar. 3, 1980

Related U.S. Application Data

[63] Continuation-in-part of Ser. No. 930,382, Aug. 2, 1978, Pat. No. 4,300,170.

[51] Int. Cl.³ .............................................. H04N 1/22
[52] U.S. Cl. .................................................. 358/296
[58] Field of Search ............................... 250/201–202, 250/209, 211 R, 211 J, 548, 206, 555–563; 318/576–577; 358/285, 286, 293, 296–304

[56] References Cited

U.S. PATENT DOCUMENTS

| | | | |
|---|---|---|---|
| 2,415,450 | 2/1947 | Swann | 358/297 |
| 2,801,279 | 7/1957 | Yule | 358/283 |
| 3,225,450 | 12/1965 | Stanley | 250/211 R |
| 3,293,439 | 12/1966 | Marantette et al. | 250/211 R |
| 3,322,952 | 5/1967 | Jewell | 318/577 |
| 3,480,783 | 11/1969 | Mankarious | 250/211 J |
| 3,502,880 | 3/1970 | Martinek et al. | 318/577 |
| 3,726,994 | 4/1973 | Ross | 358/294 |
| 3,770,940 | 11/1973 | Harr | 340/146.3 H |
| 3,840,739 | 10/1974 | Coulter | 318/577 |
| 3,868,555 | 2/1975 | Knowles | 318/577 |
| 3,993,888 | 11/1976 | Fellman | 250/209 |
| 4,151,451 | 4/1979 | Maertins et al. | 318/577 |
| 4,160,199 | 7/1979 | Bardwell | 318/577 |

Primary Examiner—Raymond F. Cardillo, Jr.
Attorney, Agent, or Firm—Yuter, Rosen & Dainow

[57] ABSTRACT

A machine for tracing an outline of an original picture and recording the same outline image as the picture for making a cutting mask for photo-printing, which includes an optical head for receiving light from a light spot projected to the picture by a projector, detecting elements in the optical head which detect the outline of the picture and produce signals for controlling drive means, and a processing head for recording a locus of the outline onto the recording material, wherein the processing head has the same movement relative to the recording material as the optical head has relative to the original picture.

9 Claims, 20 Drawing Figures

FIG. 14 　　FIG. 15 　　FIG. 18
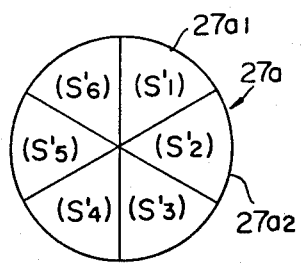
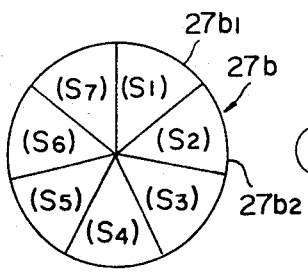
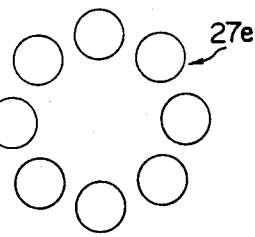
FIG. 16 　　FIG. 17 　　FIG. 19
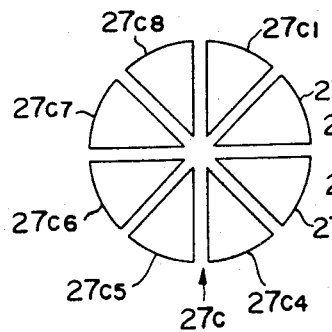
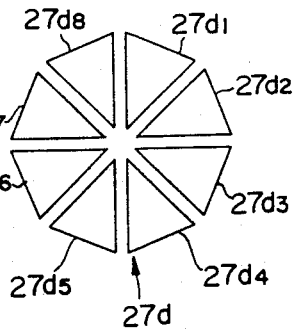
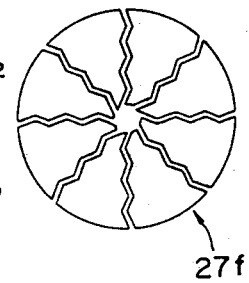
FIG. 20
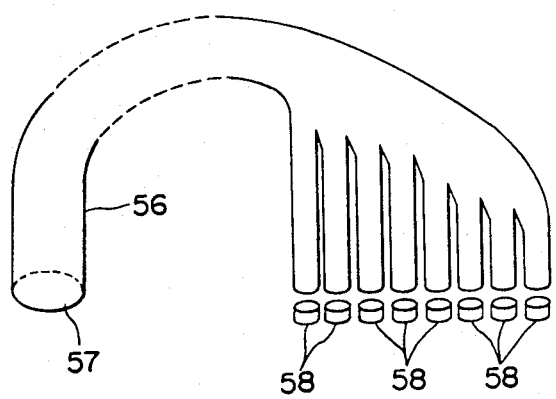

PICTURE OUTLINE TRACING AND RECORDING MACHINE

This application is a continuation-in-part of application Ser. No. 930,382, filed Aug. 2, 1978, now U.S. Pat. No. 4,300,170.

This invention relates to a machine for tracing the outline of an original picture and recording an image having the same outline as the picture to facilitate the making of a cutting mask for use in a photo-printing operation.

Cutting masks are used in many ways. When a catalogue for some goods is printed, for example, in most cases the backgrounds are removed from pictures of the goods so as to print a picture of only the goods themselves. A reproduction image is obtained by laying a film of which the necessary part is transparent and the other part is opaque on the original picture and then reproducing it photographically, thereby obtaining a reproduction image in which the unnecessary part is omitted. According to the circumstances, it may on the other hand be required to provide a mask in which the necessary part is opaque and the unnecessary part transparent.

Such a cutting mask has heretofore been made by hand. For example, in the same manner as when tracing a drawing, a transparent film sheet is laid on the original picture and the outline of the object to be masked in the picture is drawn. The outside or inside of the outline is then blotted out by opaque ink to obtain the cutting mask.

Such hand work presents no problems if the object to be masked has a simple outline, but if the object has a complicated outline, much skill and a lot of time are required. Hence it is quite difficult to obtain an accurate cutting mask quickly for a photographic plate-making process.

Alternatively, a photo-film of the desired size, reproduced by printing, may have the background obliterated by opaque ink to obtain the cutting mask. This method enables an accurate mask to be provided, but involves several hand work processes and thus involves a high cost.

In order to overcome the problems, the following methods have been proposed. In the first method, a peeloff laminate film comprising a colorless transparent film and a colored transparent film having a safe light color such as red, is laid on the original picture, and the transparent color film is cut along the outline of the object in the picture. The unnecessary part of the transparent color film cut is then peeled off to obtain the cutting mask. This method skips the process of blotting out with opaque ink, but the cutting is done by hand by means of a thin-bladed cutter, and accordingly this method still involves the difficulty for making the cutting mask having a complicated outline.

In a second method, an electronic color separation scanner or a color scanner for plate-making is used, as disclosed in the Japanese Patent Laying-Open Publication No. 47-17501 (Japanese patent application No. 46-4149).

In this case, the background of the object to be masked in the picture is set to a specific color prior to photographing the picture. When the original picture is scanned for color separation by the color scanner, the specific color of the background only is detected and exposed on a recording film to provide the cutting mask.

By this method an accurate cutting mask can be prepared automatically, but this method is only applicable to an original picture of which the background has been set to a specific color and is not applicable to an ordinary picture. Further, this method requires the use of a costly color scanner.

It is an object of the present invention to provide a picture outline tracing and recording machine for making a cutting mask free from the abovementioned defects and enabling quick and accurate operation.

According to the present invention there is provided a picture outline tracing and recording machine, comprising:

means for supporting an original picture bearing an outline;

means for supporting a recording medium;

an optical head sensitive to light from a restricted spot area on the original picture;

a plurality of optical detecting elements included in the optical head, each of which receives light from a different part of the spot area, and each of which produces an output signal related to the light it receives;

a processing head which records an outline on the recording medium;

first displacing means which displaces the original picture with respect to the optical head and simultaneously displacing the recording medium with respect to the processing head in the same direction to the same extent;

second displacing means, controlled by control signals, which displaces the original picture with respect to the optical head and simultaneously displacing the recording medium with respect to the processing head in the same direction to the same extent, the total displacement of the original picture with respect to the optical head and of the recording medium with respect to the processing head being the sum of the displacements effected by said first and second displacing means; and a control means which processes the output signals from the optical detecting elements and produces the control signals, said control signals controlling said second displacing means so as to move said optical head with respect to said original picture so as to center said outline in said spot area so as to traverse the center of said spot area, when said outline falls in said spot area.

In order that the present invention may be better understood, one preferred embodiment will now be described with reference to the accompanying drawings, wherein:

FIGS. 14-19 are other detecting elements which may be used in a machine according to the present invention; and FIG. 20 is a perspective view of still another detecting elements utilizing optical fibers.

Figure 1:
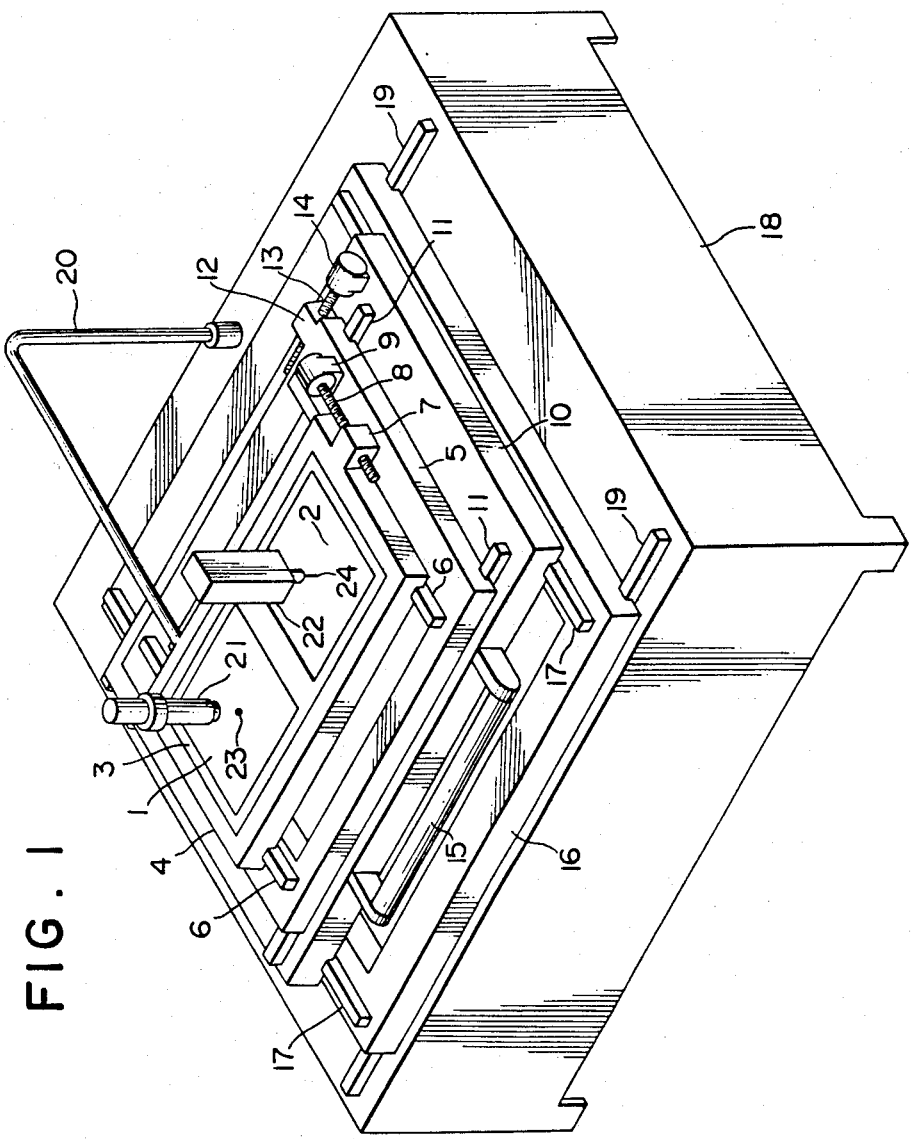
FIG. 1 is a perspective view of an embodiment of a machine according to the present invention.

In FIG. 1, there is shown a picture outline tracing and recording machine according to the present invention, in which an original picture 1 and a masking material 2 are laid on a transparent plate 3 made of a material such as glass, which is mounted to an upper frame 4. The masking material 2 is a peel-off laminate film comprising a colorless transparent film and a colored transparent film which may be cut by heating.

The upper frame 4 is mounted over a lower frame 5 and is movable to the front and rear along a pair of rails 6 which are mounted on the lower frame 5. The upper frame 4 may be moved by rotating a screw 8 which engages with a nut 7 mounted to the right side in FIG. 1 of the upper frame 4, by means of a motor 9 mounted on the lower frame 5.

The lower frame 5 is mounted over an upper drive frame 10 and is movable in the right and left directions along a pair of rails 11 which are mounted on the upper drive frame 10, by rotating a screw 13 which engages with a nut 12 mounted to the rear end of the lower frame 5, by means of a motor 14 mounted on the upper drive frame 10.

The upper drive frame 10 is mounted above a lower drive frame 16 and is movable to the front and the rear along a pair of rails 17 which are mounted on the lower drive frame 16. A handle 15 is mounted to the front end of the upper drive frame 10.

The lower drive frame 16 is mounted above a bottom frame 18 and is movable in the right and left directions along a pair of rails 19 which are mounted on the bottom frame 18.

A support 20 for an optical head 21 for detecting the position of the outline of the object in the original picture 1 and a processing head 22 for processing the masking material 2, is mounted to the bottom frame 18. The optical head 21 and the processing head 22 are positioned just above the original picture 1 and the masking material 2, respectively, and the distance between the two heads 21 and 22 is determined to be the distance between a point on the picture 1 and the corresponding point on the masking material 2.

Figure 2:
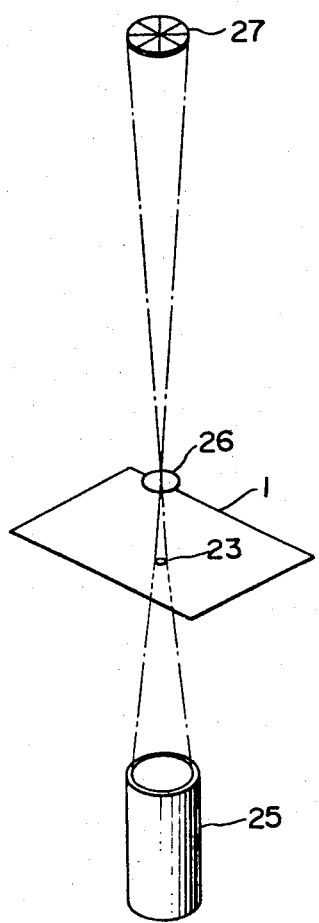
FIG. 2 is a schematic view of an optical system for a machine according to the present invention.

A projector 25 shown in FIG. 2 is arranged within the bottom frame 18 under the optical head 21 and the transparent plate 3, and projects a light spot 23 onto the picture 1, from where it is incident on the optical head 21. In addition, a light source for illuminating the entire picture 1 may preferably be mounted inside the bottom frame 18.

The processing head 22 provides a heating needle 24 which projects downwards from its bottom. The lower end of the needle 24 contacts the transparent color film of the masking material 2, and the transparent color film is cut by moving the masking material 2.

Although not shown in the figure, means for moving the needle 24 towards and away from the transparent color film 2 is provided.

The two drive frames 10 and 16 are, in the present embodiment, adapted to be moved by hand by the handle 15, but other drive means such as a combination of a feed screw and a nut, a turning handle and a motor, or the like, may be used instead in other embodiments.

The operation of making a mask by using the machine of FIG. 1 will now be described.

The original picture 1 and the masking material 2 are attached to the transparent plate 3 by clips or other proper attaching means not shown. Then the operator grips handle 15 and adjusts by hand the position of the original film 1, with respect to the optical head 21, by sliding frames 10 and 16 along rails 17 and 19, until the outline to be traced is approximately centrally located under the optical head 21. Then the optical head and its associated systems are switched on. As explained below, the head senses the position and orientation of the outline under it, and outputs signals to the motors 9 and 14 which cause them to drive frames 4 and 5 along rails 6 and 11 so as to center precisely the outline under the optical head 21. Next, the needle 24 is caused to approach the masking material 2 so as to start cutting it. Then the operator, gripping by hand the handle 15, pushes the frames 10 and 16 along the rails 17 and 19 so as to steer the optical head 21 along the contour of the outline in the original picture 2 to be traced out. Naturally such steering will only be approximate, and by itself would never follow the outline sufficiently accurately. However, by the operation of the optical head 21 and its associated circuitry, which outputs control signals to the motors 9 and 14, as explained below, whenever the outline starts to move away from the central location under the optical head 21, control signals are sent to the mortors 9 and 14 which cause them to drive the frames 4 and 5 along the rails 6 and 11 so as to bring the outline back precisely centrally under the optical head 21. By this self-centering operation of the head 21, the head is caused to follow the outline in the original picture 1 precisely. In fact, what actually happens is that, when the operator through inexactitude of guidance displaces the head 21 in a direction normal to the outline to be followed, this displacement is cancelled automatically by the motors 9 and 14. However, when the operator displaces the head 21 along the outline, of course the head does not detect any alteration of contour, and no cancellation occurs.

Thereby, the head 21 is caused to move round the outline in the original picture 1. Correspondingly, therefore, the needle 24 is simultaneously guided around an isomorphic outline on the masking material 2 and cuts a mask as required. When the operator has steered the head 21 around the entire outline in the original picture 1, he retracts the needle 24 and removes the original picture and the completed mask from the machine.

The centering operation of the optical head and its associated systems will now be described.

In FIG. 2, there is shown an optical system comprising the projector 25, a lens 26 and detecting elements 27, the latter two members 26 and 27 being included in the optical head 21.

The projector 25 projects the light spot 23 to the picture 1 and the light from the light spot 23 is incident to the optical head 21, as described above. A plurality of photo-electric detecting elements 27 (eight elements are shown in FIG. 2), each having the same nature or properties, are radially arranged around the central optical axis of the optical head 21.

With reference to FIGS. 3-7, the method for determining the orientation of the outline and the offset direction of the outline of the object will now be described.

First, the determination of the orientation of the outline will be described. In FIGS. 3-7, hatching portions indicate dark portions projected of the original picture and for the sake of simplicity of explanation it will be supposed that the dark portions are completely opaque and the light portions are completely transparent.

There are shown eight photo-electric detecting elements 271, 272, 273, 274, 275, 276, 277 and 278 which produce output signals $S_1$, $S_2$, $S_3$, $S_4$, $S_5$, $S_6$, $S_7$ and $S_8$, respectively. Unless the outline of the object is positioned in the light spot 23, each detecting element receives the same amount of light and thus outputs the same signal. If the outline of the object is positioned in the light spot 23, since the intensity of the picture is different on opposite sides of the outline, the detecting elements receive different amounts of light and hence output different amounts. From the different output signals of the detecting elements, the orientation and the direction of offset of the outline from the center of the light spot 23 will be determined.

In order to determine the orientation of the outline, the eight detecting elements are divided into two groups of four adjacent elements, resulting in four different combinations. In each case, the difference value signals $E_1$, $E_2$, $E_3$ or $E_4$ between the total output signals of the four elements of the two groups is calculated by the following formulae:

$$E_1 = |(S_1+S_2+S_3+S_4)-(S_5+S_6+S_7+S_8)|$$

$$E_2 = |(S_2+S_3+S_4+S_5)-(S_6+S_7+S_8+S_1)|$$

$$E_3 = |(S_3+S_4+S_5+S_6)-(S_7+S_8+S_1+S_2)|$$

$$E_4 = |(S_4+S_5+S_6+S_7)-(S_8+S_1+S_2+S_3)|$$

The maximum difference value is selected from the group of difference signals $E_1$, $E_2$, $E_3$ or $E_4$. The orientation of the outline is within 22.5° of the boundary separating the two groups of detecting elements of the output signal combination having the maximum difference value.

Figure 3:
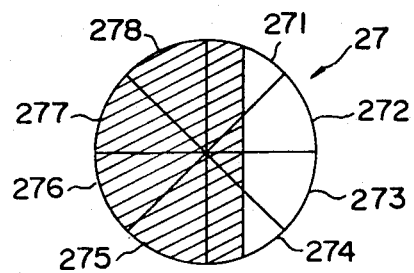
FIGS. 3-7 are schematic views of detecting elements used in a machine according to the present invention, in which an outline of an object to be masked is in different positions.

In FIG. 3, the outline is parallel to the boundary which divides the photo-electric elements into two groups, one of numbers 271, 272, 273 and 274 and the other of numbers 275, 276, 277 and 278. The outline is offset toward the group including the elements 271, 272, 273 and 274.

Now, assuming that the output signal of the detecting element is 1 when the element is fully covered by the light part, since the output signal of the element is in proportion to the area of the light part, the following values are obtained:
$S_1 = S_4 = 0.30$
$S_2 = S_3 = 0.85$
$S_5 = S_6 = S_7 = S_8 = 0$
The difference value signals $E_1$ to $E_4$ are calculated, thereby obtaining the following values: $E_1 = 2.30$, $E_2 = 1.70$, $E_3 = 0$, $E_4 = 1.70$. $E_1$ is maximum.

Figure 4:
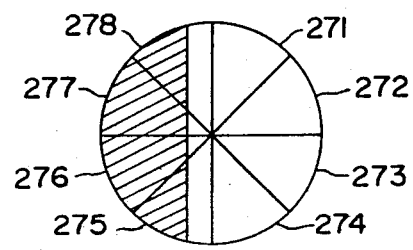

In FIG. 4, the orientation of the outline is the same as the one of FIG. 3, but the outline is offset toward the group including the elements 275, 276, 277 and 278. In this case, the following values are obtained:
$S_1 = S_2 = S_3 = S_4 = 1$
$S_5 = S_8 = 0.50$
$S_6 = S_7 = 0.05$
Thus, $E_1 = 2.90$, $E_2 = 1.90$, $E_3 = 0$, $E_4 = 1.90$. $E_1$ is maximum.

Figure 5:
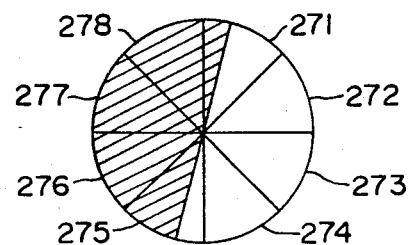

In FIG. 5, the outline passes through the center of the detecting elements and is inclined at a small angle to a boundary between two groups of the detecting elements. In this case, the output signal values are:
$S_2 = S_3 = S_4 = 1$, $S_1 = 0.70$,
$S_5 = 0.30$, $S_6 = S_7 = S_8 = 0$
Therefore, $E_1 = 3.40$, $E_2 = 2.60$, $E_3 = 0.60$, $E_4 = 1.40$. $E_1$ is maximum.

Figure 7:
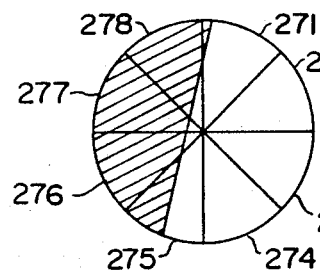
Figure 6:
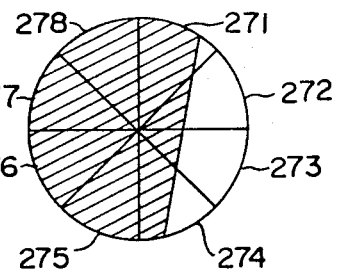

In FIGS. 6 and 7, the outline is offset from the center of the detecting elements and is inclined to the boundary between two groups of the detecting elements. It is readily understood that $E_1$ is maximum in the same manner as described above.

The orientation of the outline of the object, it may be also determined by selecting the output combination having the minimum total difference value from $E_1$ to $E_4$. In this case, the orientation is indicated by the line perpendicular to the boundary of the two element groups of the output signal combination having the minimum total difference value of the output signals.

Next, the determination of the offset direction of the outline with respect to the center of the detecting elements will be described.

When $E_1$ is maximum or $E_3$ is minimum, the two following calculations are made:

$$E_{11} = |(S_2+S_3)-(S_1+S_4)|$$

$$E_{12} = |(S_6+S_7)-(S_5+S_8)|$$

These formulae mean, as readily understood from FIGS. 3-7, that the difference between the total output signals of the two inner and that of the two outer of the detecting elements of each group of four elements separated by the boundary, is calculated.

Then the two difference value signals $E_{11}$ and $E_{12}$ are compared. If $E_{11}$ is larger than $E_{12}$, the outline projected is offset to the detecting elements regarding the calculation of $E_{11}$, and vice versa.

In the case of FIG. 3, $E_{11} = 1.10$, $E_{12} = 0$, $E_{11} > E_{12}$. The outline is offset to the right side of the center.

In the case of FIG. 4, $E_{11} = 0$, $E_{12} = 0.90$, $E_{11} < E_{12}$. The outline is offset to the left side of the center.

In the case of FIG. 5, $E_{11} = 0.30$, $E_{12} = 0.30$, $E_{11} = E_{12}$. The outline passes through the center.

In the cases of FIGS. 6 and 7, the offset directions of the outline are determined in a similar manner.

Other cases are treated in a similar manner as when $E_1$ is maximum or $E_3$ is minimum, using the following sets of formulae:

When $E_2$ is maximum or $E_4$ is minimum:

$$E_{21} = |(S_3+S_4)-(S_2+S_5)|$$

$$E_{22} = |(S_7+S_8)-(S_6+S_1)|$$

When $E_3$ is maximum or $E_1$ is minimum:

$$E_{31} = |(S_4+S_5)-(S_3+S_6)|$$

$$E_{32} = |(S_8+S_1)-(S_7+S_2)|$$

When $E_4$ is maximum of $E_2$ is minimum:

$$E_{41} = |(S_5+S_6)-(S_4+S_7)|$$

$$E_{42} = |(S_1+S_2)-(S_8+S_3)|$$

Although in the above description it is supposed that the dark portions are completely opaque, such a condition is not always required. However, there must be a sufficient intensity contrast between both sides of the outline projected, and thus the theory described above is realized, thereby enabling the determination of the orientation and the offset direction of the outline.

Figure 8:
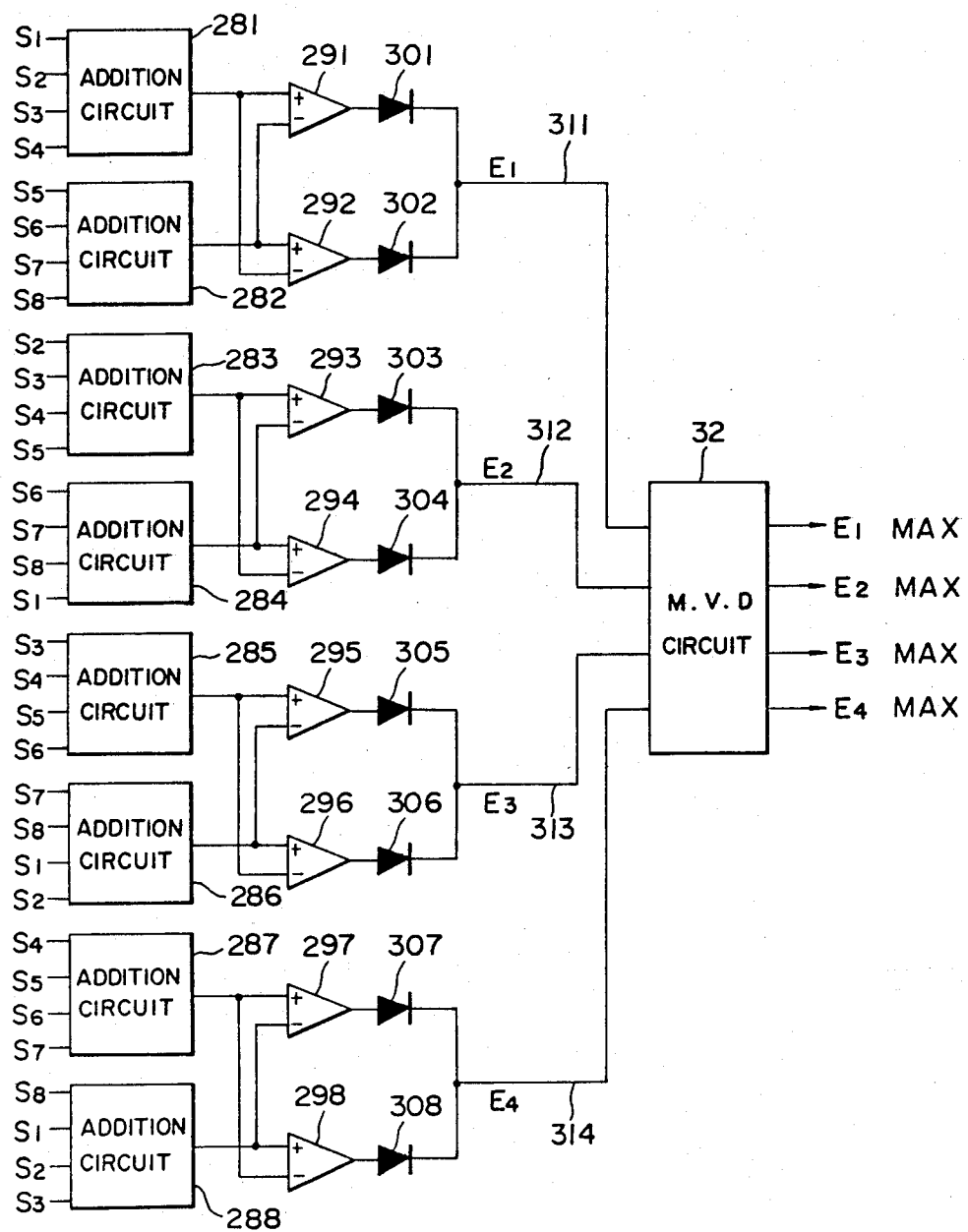
FIG. 8 is a schematic view of a circuit for determining the orientation of the outline of the object used in a machine according to the present invention.

In FIG. 8 is shown a orientation determining circuit for determinimg the orientation of the outline of the object from the output signals of the detecting elements, which comprises eight addition circuits 281, 282, 283, 284, 285, 286, 287 and 288, eight differential amplifiers 291, 292, 293, 294, 295, 296, 297 and 298, eight diodes 301, 302, 303, 304, 305, 306, 307 and 308, and a maximum value determining circuit ( or minimum value determining circuit ) 32, which is hereinafter referred to as an M.V.D. circuit.

The output signals $S_1$, $S_2$, $S_3$ and $S_4$ are input to the addition circuit 281 and are added there. The output signal of the addition circuit 281 is sent to the positive of the differential amplifier 291 and the negative of the differential amplifier 292. The output signals $S_5$, $S_6$, $S_7$ and $S_8$ are put into the addition circuit 282 and are added there. The output signal of the addition circuit 282 is sent to the negative of the differential amplifier 291 and the positive of the differential amplifier 292.

The output signals of the differential amplifiers 291 and 292 pass through the diodes 301 and 302 and then meet together at the output line 311.

When the output signal of the addition circuit 281 is larger than that of the addition circuit 282, the output signal passes through the diode 301. On the other hand the output signal of the addition circuit 282 is larger than that of the addition circuit 281, the output signal passes through the diode 302. The difference value signal $E_1$ is obtained on the output line 311 based on the following formula:

$$E_1 = |(S_1+S_2+S_3+S_4) - (S_5+S_6+S_7+S_8)|$$

Regarding the other addition circuits 283-288, differential amplifiers 293-298 and diodes 303-308, the difference value signals $E_2$, $E_3$ and $E_4$ are obtained on the output lines 312, 313 and 314, respectively, as shown in FIG. 8.

The difference value signals $E_1$, $E_2$, $E_3$ and $E_4$ are sent to the M.V.D. circuit 32, which determines which difference value signal $E_1$, $E_2$, $E_3$ or $E_4$ has the maximum value (or the minimum value).

Figure 9:
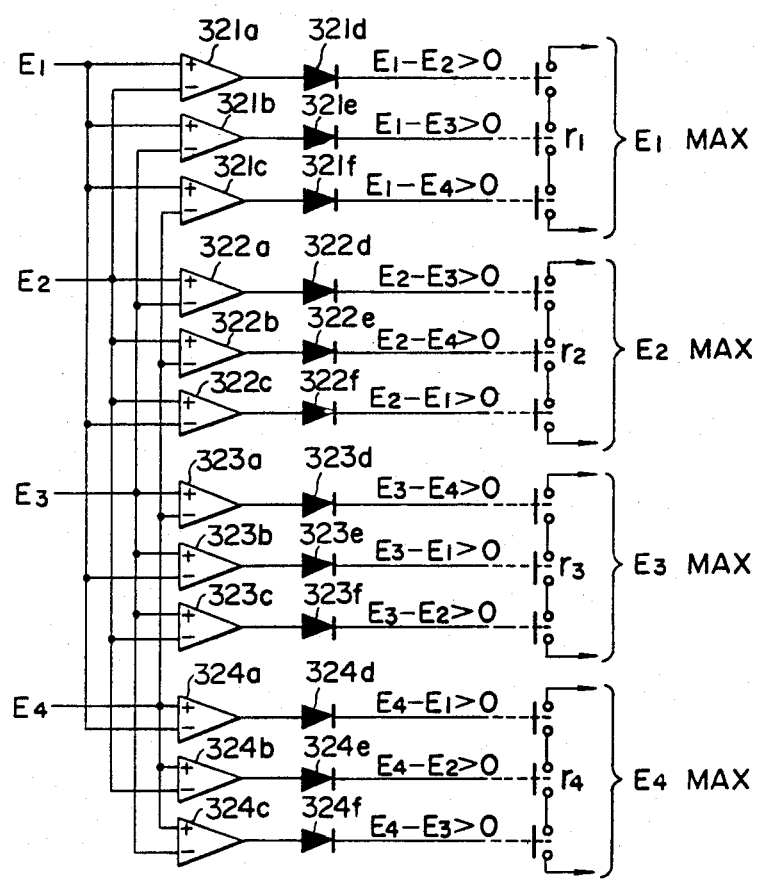
FIG. 9 is a schematic view of a maximum value determining circuit as used in the circuit of FIG. 8.

One example of the M.V.D. circuit 32 is shown in FIG. 9, and comprises four combinations each of three differential amplifiers; 321a, 321b and 321c; 322a, 322b and 322c; 323a, 323b and 323c; and 324a, 324b and 324c; four combinations each of three diodes: 321d, 321e and 321f; 322d, 322e and 322f; 323d, 323e and 323f; and 324d, 324e and 324f; and four gate circuits $r_1$, $r_2$, $r_3$ and $r_4$.

One difference value signal such as $E_1$ is sent to the positive inputs of one combination of differential amplifiers such as 321a, 321b and 321c and the other difference value signals such as $E_2$, $E_3$ and $E_4$ are sent to the negative inputs of each of the differential amplifiers such as 321a, 321b and 321c.

The output signals from the combination of differential amplifiers such as 321a, 321b and 321c are passed through the combination of diodes such as 321d, 321e and 321f and then sent to the gate circuit such as $r_1$.

When the difference value signals $E_1$, $E_2$, $E_3$ and $E_4$ are sent to the M.V.D. circuit 32, the gate circuit $r_1$, $r_2$, $r_3$ or $r_4$ which corresponds to the maximum difference value signal closes and outputs a signal, thereby determining which difference value signal is the maximum.

The determination described above may be also performed by selecting the minimum difference value of the output signals by inserting subtraction circuits before the first stage of FIG. 9 to subtract each of the signal values $E_1$ to $E_4$ from a constant value.

Figure 10:
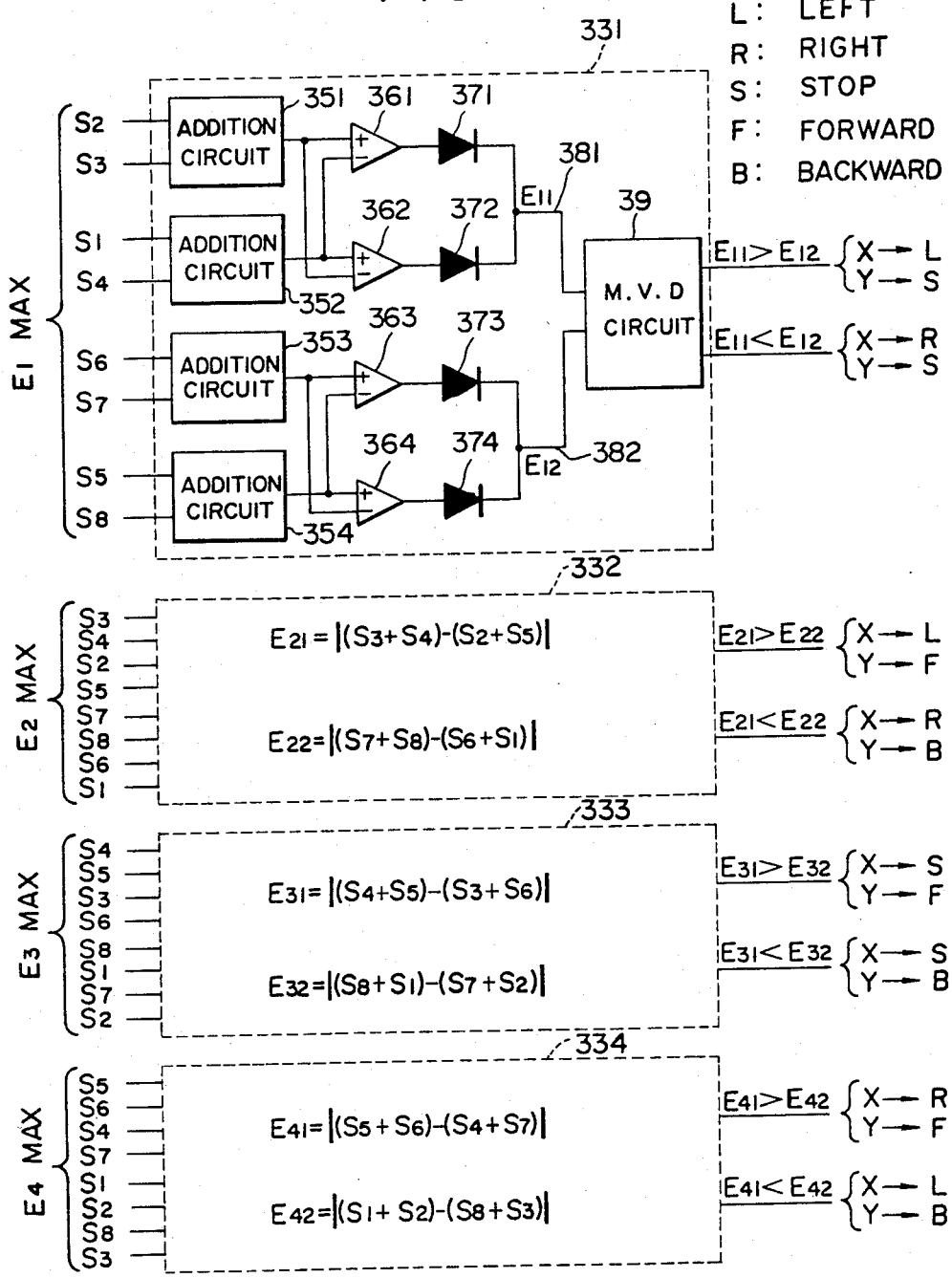
FIG. 10 is a schematic view of a control circuit for outputting control signals for adjusting the outline of the object to the central point of an optical head depending on the output signals of the detecting elements.

In FIG. 10, there is shown a control circuit which detects the offset direction of the outline of the object from the output signals $S_1$ to $S_8$ and outputs control signals for driving the motors 9 and 14 in order to adjust the outline to the central point of the optical head 21. The control circuit comprises four comparator circuits 331, 332, 333 and 334, each of which acts corresponding to one of the difference value signals having the maximum ( or minimum ) value of $E_1$, $E_2$, $E_3$ or $E_4$, determined by the orientation determining circuit of FIG. 8.

The comparator circuit 331 which acts when $E_1$ is maximum or $E_3$ is minimum, comprises four addition circuits 351, 352, 353 and 354, four differential amplifiers 361, 362, 363 and 364, four diodes 371, 372, 373 and 374, and a M.V.D. circuit 39.

The output signals $S_2$ and $S_3$ are input to the addition circuits 351 and are added there. The output signal from the addition circuit 351 is sent to the positive of the differential amplifier 361 and the negative of the differential amplifier 362.

The output signals $S_1$ and $S_4$ are input to the addition circuit 351 and are added there. The output signal from the addition circuit 352 is fed to the negative of the differential amplifier 361 and the positive of the differential amplifier 362.

The output signals from the differential amplifiers 361 and 362 are passed through the diodes 371 and 373, and then meet at the output line 381. The difference value signal $E_{11}$ is obtained on the output line 381, based on the following formula:

$$E_{11} = |(S_2+S_3) - (S_1+S_4)|$$

The two pairs of output signals $S_6$ and $S_7$, and $S_5$ and $S_8$ are fed to the addition circuits 353 and 354 in the same manner, as described above, are passed through the differential amplifiers 363 and 364 and the diodes 373 and 374, and then the difference value signal $E_{12}$ is obtained on the output line 382, based on the following formula:

$$E_{12} = |(S_6+S_7) - (S_5+S_8)|$$

The difference value signals $E_{11}$ and $E_{12}$ are sent to the M.V.D. circuit 39 which determines which difference value signal is maximum.

Figure 11:
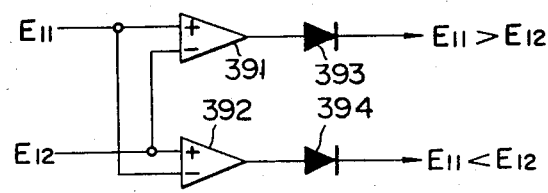
FIG. 11 is a schematic view of a maximum value determining circuit as used in the control circuit of FIG. 10.

One embodiment of the M.V.D. circuit 39 is shown in FIG. 11, and comprises a pair of differencial amplifiers 391 and 392 and a pair of diodes 393 and 394. The difference value signal $E_{11}$ is fed to the positive input of the differential amplifier 391 and the negative input of the differential amplifier 392.

The difference value signal $E_{12}$ is sent to the negative input of the differential amplifier 391 and the positive input of the differential amplifier 392. The output signals of the differential amplifiers 391 and 392 are passed through the diodes 393 and 394. When the signal $E_{11}$ is larger than the signal $E_{12}$, the output through the diode 393 is obtained. When the signal $E_{11}$ is smaller than the $E_{12}$, the output through the diode 394 is obtained.

The comparator circuits 332, 333 and 334 which act when $E_2$ is maximum or $E_4$ is minimum, when $E_3$ is maximum or $E_1$ is minimum, and when $E_4$ is maximum or $E_2$ is minimum, respectively, have corresponding constructions and functions corresponding to the comparator circuit 331 described above.

The offset direction of the outline is determined by the control circuit of FIG. 10, as described above. If the outline is offset from the center of the detecting elements, one of the eight diodes 393, 394, ... ( only two diodes are shown ) of the M.V.D. circuit 39 of FIG. 11 corresponding to the offset direction, outputs a signal for controlling the motors 9 and 14 so that the outline may be moved towards the center of the detecting elements.

For example, as in the case shown FIGS. 3 and 6, in which the orientation of the outline is substantially parallel to the Y-axis and the outline is offset to the right from the center of the detecting elements, the motor 9 which moves the upper frame 4 in the Y-axis direction, i.e. frontwards (F) and backwards (B), is stopped (S), and the motor 14 which moves the lower frame 5 in the X-axis direction, i.e. to the right (R) and to the left (L), is driven to move the original picture 1 in the X-axis direction in order to adjust the outline to the center of the detecting elements.

In this case, the outline projected upside-down through the lens 26 moves to the reverse direction with respect to the original picture 1. Consequently, when the outline must be moved leftwards, as in the case of FIG. 3, the motor is controlled so that the lower frame 5 is moved rightwards.

Although the present invention has been described in detail in terms of one preferred embodiment thereof illustrated in FIG. 1, which is given by way of illustration only and thus is not limitative of the present invention, various modifications can be made without departing from the scope of the present invention.

For example, in the machine shown in FIG. 1, the optical head 21 and the processing head 22 are fixed relative to the base, while the original picture 1 and the masking material 2 laid on the transparent plate 3 are moved by moving the transparent plate 3, whose motion is the sum of the operator-induced path-following motion, and the correcting motion provided by the optical head 21 and the motors. However, the optical head and the processing head may be moved by the operator, while the original picture and the masking material are moved by the optical head and the motors, for correction.

In this case, the two heads should be adapted to be moved together by the operator, while maintaining a fixed relative position, by a parallel or inline transfer mechanism, and the projector should be always positioned directly under the optical head. In such a machine, the original picture and the masking material are moved only when the outline of the object is to be adjusted to the center of the optical head by using the control signals from the optical head. Accordingly, the upper and lower drive frames 10 and 16 of the embodiment shown in FIG. 1 are not necessary in this embodiment, and thus its construction can be simplified.

The operation for making a cutting mask by moving the two relatively light heads is conducted more readily than the machine of FIG. 1, in which the four frames 4, 5, 10 and 16 are moved by the handle 15.

Further, in this machine the heads are moved in the direction of tracing the outline, and thus this is much more convenient than the machine of FIG. 1, wherein the outline is moved relative to the heads in the reverse direction to that traced.

Figure 12:
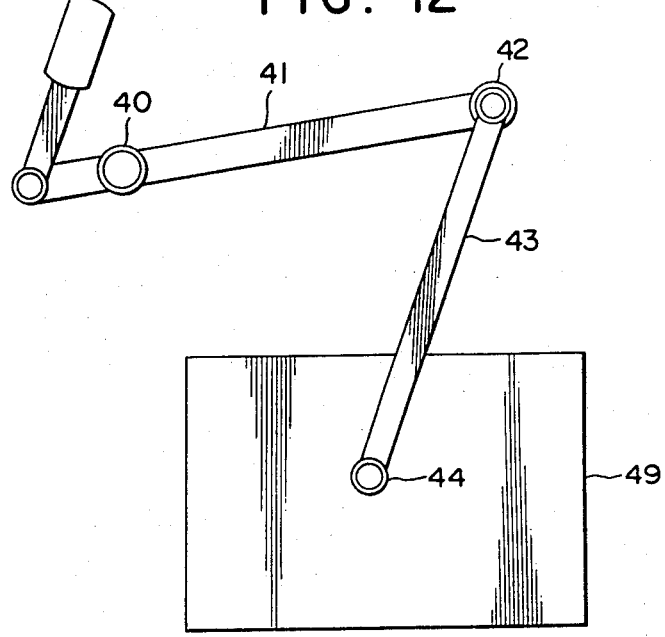
FIG. 12 is a plan view of another embodiment of a machine according to the present invention.
Figure 13:
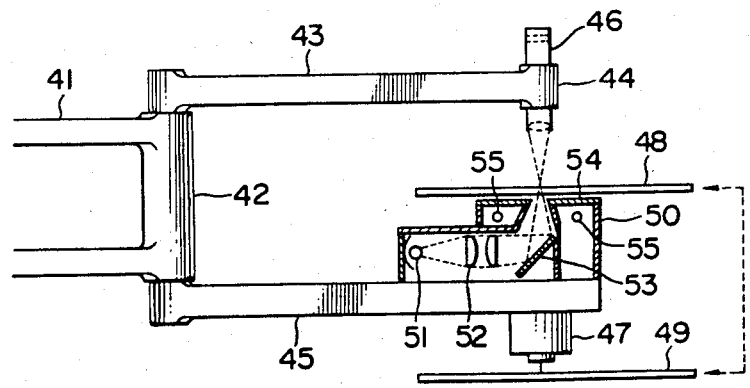
FIG. 13 is a side view, partly in section, of the machine of FIG. 12.

In FIGS. 12 and 13 is shown another picture outline tracing and recording machine according to the present invention.

In this case, as shown in FIG. 12, an inline transfer machanism is used, comprising a center axial shaft 40 fixed to the base of the machine, a first arm 41 which is rotatable around the center axial shaft 40, a pivot shaft 42, a second arm 43, and an end pivot shaft 44 disposed at the end of the second arm 43, the first and second arms being pivotable around the pivot shaft 42. The center axial shaft 40, the pivot shaft 42, and the end pivot shaft 44 are provided with pulleys which are not shown which all have the same diameter, and nonextensible belts or wires which are not shown in the figure are passed around these pulleys in such a way, as is well known in the mechanical art, that the pulley disposed on the end pivot shaft 44 cannot turn with respect to the base of the machine, although by turning the arms about the shafts the end pivot shaft can freely be moved about in the plane corresponding to the drawing paper. A counterweight is provided at the other end of the first arm 41, as shown.

In this embodiment, the second arm 43 comprises an upper second arm 43 and a lower second arm 45 which is positioned just under the upper second arm 43 and is connected integrally with it. The pulley is disposed on the upper second arm 43.

An optical head 46 is mounted to the pulley disposed to the end pivot shaft 44 and is thus pivoted with the pulley with respect to the upper second arm 43, and therefore cannot turn with respect to the base of the machine, although it can be displaced in both directions parallel to it. The optical head 46 may be the same one as used in the machine of FIG. 1. A processing head 47 which is the same as used in the machine of FIG. 1, is mounted to the lower surface of the lower second arm 45.

A picture frame 48 is arranged between the upper and the lower second arms 43 and 45, and a masking material frame 49 is arranged below the lower second arm 45. The picture frame 48 and the masking material frame 49 are parallel, and are adapted to be moved simultaneously with respect to the base by the same distance in the same direction by drive means similar to the motors 9 and 14 shown in FIG. 1.

A projector 50 comprising a light spot projecting system which comprises a light source 51, condensing lens and a reflecting mirror, and an illumination means which comprises an illumination plate 54 and light sources 55, is mounted to the upper surface of the lower second arm 45.

The light spot projecting system projects a light spot onto the original picture attached to the picture frame 48, and the light from the light spot is incident on the optical head 46. The illumination means illuminates the surroundings of the light spot of the picture in order to observe easily the outline of the picture.

In this embodiment, the light axis of the optical head 46 and the projector 50 and the heated needle of the processing head 47 are on a vertical axis. Thus, the locus of the light spot on the picture is the same as that of the hot needle on the masking material, and hence a reproduction having the same outline as the picture is obtained on the masking material by tracing the outline of the picture by means of the optical head 46.

In this operation, an offset of the outline from the center of the optical head 46, is detected by the detecting elements of the optical head 46 and is corrected in the same manner described above for the machine of FIG. 1.

As regards the detecting elements, in the embodiments described above eight elements are radially arranged, but the number of elements is not restricted to eight.

For instance, in FIG. 14 there are shown six photoelectric detecting elements $27a_1$, $27a_2$, $27a_3$, $27a_4$, $27a_5$ and $27a_6$ which produce outputs $S_1$, $S_2$, $S_3$, $S_4$, $S_5$ and $S_6$.

The orientation of the outline in this case may be determined by the following formulae of the difference value signals $E_1$, $E_2$ and $E_3$ in a similar manner to that described above.

$$E_1 = |(S_1+S_2+S_3)-(S_4+S_5+S_6)|$$

$$E_2 = |(S_2+S_3+S_4)-(S_5+S_6+S_1)|$$

$$E_3 = |(S_3+S_4+S_5)-(S_6+S_1+S_2)|$$

The offset direction of the outline from the center of the optical head is determined by the following formalae of the difference value signals $E_{11}$ and $E_{12}$, $E_{21}$ and $E$, and $E_{31}$ and $E_{32}$ in a similar manner to that described above.

When $E_1$ is maximum, $$E_{11} = |(S_1+S_3)-2S_2|$$

$$E_{12} = |(S_4+S_6)-2S_5|$$

When $E_2$ is maximum, $$E_{21} = |(S_2+S_4)-2S_3|$$

$$E_{22} = |(S_5+S_1)-2S_6|$$

When $E_3$ is Maximum, $$E_{31} = |(S_3+S_5)-2S_4|$$

$$E_{32} = |(S_6+S_2)-2S_1|$$

The number of the detecting elements may be, of course, any even number such as ten, twelve, and so forth.

Further, the number of the detecting elements may be also an odd number. For example, in FIG. 15 are shown seven elements $27b_1$, $27b_2$, $27b_3$, $27b_4$, $27b_5$, $27b_6$ and $27b_7$ which produce outputs $S_1$, $S_2$, $S_3$, $S_4$, $S_5$, $S_6$ and $S_7$, respectively.

The orientation of the outline is determined by the following formulae of the difference value signals $E_1$, $E_2$, $E_3$ and $E_4$ in the same manner as described above.

$$E_1 = |(S_1+S_2+S_3+S_4)-(S_4+S_5+S_6+S_7)|$$

$$E_2 = |(S_2+S_3+S_4+S_5)-(S_5+S_6+S_7+S_1)|$$

$$E_3 = |(S_3+S_4+S_5+S_6)-(S_6+S_7+S_1+S_2)|$$

$$E_4 = |(S_4+S_5+S_6+S_7)-(S_7+S_1+S_2+S_3)|$$

The offset direction of the outline from the standard point of the optical head is determined in the same manner as for eight detecting elements.

The detecting elements described above are constututed by the sector-shaped elements, resulting in a complete disc shape. However, it is difficult in practice to obtain a complete disc shape of the detecting elements. Detecting elements $27c_1$, $27c_2$, $27c_3$, $27c_4$, $27c_5$, $27c_6$, $27c_7$ and $27c_8$, shown in FIG. 16 are arranged radially, but separated from one another by a space of a certain width.

In this case, it is possible to determine the orientation and the offset direction of the outline, but accuracy of the adjustment is lowered. If the outline is projected to the detecting elements on an enlarged scale, the adjustment degree of the outline to the center of the light spot on the picture surface is a function of the width of the border space divided by the projecting magnification.

If it is less than an acceptable value required of the cutting mask itself, such detecting elements can be satisfactorily practicable.

As shown in FIG. 17, triangular detecting elements $27d_1$, $27d_2$, $27d_3$, $27d_4$, $27d_5$, $27d_6$, $27d_7$ and $27d_8$ may be also used.

If the acceptable value required of the cutting mask is large enough, as shown in FIG. 18 circular elements $27e_1$, $27e_2$, $27e_3$, $27e_4$, $27e_5$, $27e_6$, $27e_7$ and $27e_8$ may be arranged on the circumference of a circle.

On the other hand, if the acceptable value required of the cutting mask is small, as shown in FIG. 19, detecting elements $27f_1$, $27f_2$, $27f_3$, $27f_4$, $27f_5$, $27f_6$, $27f_7$ and $27f_8$ having crooked edges so that the outline may be always projected, at least partly, to the photo-electric detecting elements, may be used:

Furthermore, optical fibers may be utilized for receiving the projected light and transferring it to the detecting elements. In FIG. 20, there is shown a bundle of optical fibers 56 having a light entrance end 57 and a plurality of light exit ends divided, each exit end facing a photo-electric elements 58.

Although the original picture has been described above as a transparent film such as phtographic film, however, an opaque original picture may also be used. In this case, the projector is provided to the optical head and projects the light spot to the original picture and the light from the light spot is incident on the optical head.

Of course, the provision of a light spot is not crucial to the present invention. If the original picture is sufficiently strongly illuminated over all its surface, it will be possible for the optical head to function using this overall illumination, without any special light projector producing any light spot. All such modifications, and many others which might be made by a man of ordinary skill in the art to the form and the detail of the embodiments of this invention, are to be understood as coming within the spirit of the invention.

What is claimed is:

1. A picture outline tracing and recording machine comprising a first support for an original picture having an outline, a second support for a recording medium, an optical head means movably positioned with respect to said first support to receive light from a spot area of said picture and having a plurality of optical detecting elements each positioned to receive light from a different portion of said spot area, said detecting elements providing output signals in response to the reception of light thereby, a processing head means movably positioned with respect to said second support to record an outline on said medium, manually operable means for displacing said processing and optical head means in common with respect to said medium and original respectively, means responsive to said output signals for producing control signals, and second means connected to receive said control signals and responsive thereto for displacing said processing and optical head means in common with respect to said medium and original respectively, whereby the total displacement of said optical head means with respect to said original picture and the total displacement of said processing head means with respect to said medium are the sum of the respective displacements effected by said manually operable means and said second means.

2. A picture outline tracing and recording machine according to claim 1, wherein said detecting elements have substantially identical shapes and are equally distributed about a common point.

3. A picture outline tracing and recording machine according to claim 1, wherein said detecting elements have substantially identical shapes with pointed ends, and are distributed about a common point with their pointed ends directed to said point.

4. A picture outline tracing and recording machine according to claim 1, wherein said detecting elements are substantially sector shaped and are equally distributed about a common point.

5. The picture outline tracing and recording machine of claim 1, wherein said second means connected to receive said control signals comprises first frame means for moving said first and second supports with respect to said optical and processing head means respectively; and said manually operable means comprises second frame means mounted to move said first and second support with respect to said optical and processing head means.

6. The picture ouline tracing and recording machine of claim 5 wherein said first frame means supports said first and second supports to hold said original picture and recording medium spaced apart in a common plane, and wherein said second frame means movably supports said first frame means, and is in turn movably supported on a base, said second frame means comprising handle means for being moved manually.

7. The picture outline tracing and recording machine of claim 6, wherein said first and second frame means each comprise a pair of frames mounted one above the other, and rail means, whereby the frames of each frame means are moveable only in one direction.

8. The picture outline tracing and recording machine of claim 1, wherein the center axes of the optical head means and processing head means are inline on a common axis.

9. The picture outline tracing and recording machine of claim 1, wherein the center axes of the optical head means and processing head means are parallel and spaced apart from one another.

* * * * *

UNITED STATES PATENT AND TRADEMARK OFFICE
CERTIFICATE OF CORRECTION

PATENT NO. : 4,498,109
DATED : Feb. 5, 1985
INVENTOR(S) : Takashi Sakamoto

It is certified that error appears in the above-identified patent and that said Letters Patent is hereby corrected as shown below:

Column 5, line 18, change "S hd 7" to --$S_7$--.

Column 11, line 35, change "and E," to --and $E_{22}$--.

Signed and Sealed this

Twelfth Day of August 1986

[SEAL]

Attest:

DONALD J. QUIGG

Attesting Officer

Commissioner of Patents and Trademarks